United States Patent
De Zwart et al.

(10) Patent No.: US 6,388,644 B1
(45) Date of Patent: May 14, 2002

(54) COLOR DISPLAY DEVICE

(75) Inventors: Siebe T. De Zwart; Sijbrandus Van Heusden; Gerrit Oversluizen, all of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/510,143

(22) Filed: Feb. 22, 2000

(30) Foreign Application Priority Data

Feb. 24, 1999 (EP) .............................................. 99200520

(51) Int. Cl.⁷ ................................................. G09G 3/36
(52) U.S. Cl. .............................. 345/60; 345/41; 345/62; 345/63; 345/67; 345/68; 345/90; 313/581; 313/582; 313/585; 313/592; 315/169.1; 315/169.3; 315/169.4

(58) Field of Search .............................. 345/41, 60, 62, 345/63, 67, 68, 90, 76, 77; 313/581, 582, 585, 592; 315/169.1, 169.3, 169.4

(56) References Cited

U.S. PATENT DOCUMENTS

| 4,743,799 A | * | 5/1988 | Loy ............................. 313/493 |
| 4,999,791 A | * | 3/1991 | Schumann .................... 364/525 |
| 5,402,143 A | * | 3/1995 | Ge et al. ...................... 345/102 |

* cited by examiner

*Primary Examiner*—Bipin Shalwala
*Assistant Examiner*—Vincent E. Kovalick

(57) ABSTRACT

In a plasma display or a field emission display, sub-pixels having extra (non-saturating) phosphors are applied to enhance the efficacy. Depending on the luminance and color of a pixel to be displayed, driving of the most efficient combination of sub-pixels is performed.

8 Claims, 3 Drawing Sheets

COLOR DISPLAY DEVICE

BACKGROUND OF THE INVENTION

The invention relates to a color display device comprising a first substrate provided with a layer of fluorescent material, and a second, transparent substrate, said color display device comprising means for addressing pixels during use. The display device may be a plasma display device but also, for example, a display device of the field emission type. The address electrodes may be present on both the first and the second substrate in the case of a plasma display device. Dependent on the type of display device, the fluorescent material is patterned or not patterned.

A display device of this type is used, inter alia, in large-area, flat display screens, for example, for HDTV.

A color display device (plasma display panel or PDP) of the type mentioned above is described in EP-A-0 488 891. This application describes measures for obtaining grey values or color gradations. To this end, the frame time is divided into a plurality of sub-frames having a weighted duration (for example in the ratio 1:2:4: . . . :128). When a color, for example green, is fully driven, a frequently used phosphor such as $Zn_2SiO_4$:Mn (willemite) exhibits saturation phenomena. The efficiency of the phosphor (number of emitted photons/number of incoming photons) deteriorates, so that the brightness decreases.

OBJECTS AND SUMMARY OF THE INVENTION

It is, inter alia, an object of the present invention to provide a display device of the type described, which has an optimum brightness or luminance, also when a given color is fully driven.

To this end, a color display device according to the invention is characterized in that the layer of fluorescent material comprises at least two different phosphors of substantially the same color at the location of a pixel.

Substantially the same color is herein understood to mean that the difference in spectral color of the emission peaks of the phosphors, measured as the distance in C.I.E co-ordinates (x, y co-ordinates) is at most 0.35 (and preferably at most 0.25).

The invention is based on the recognition that the decrease of the efficiency for different phosphors depends in different manners on the number of incoming photons. By using two phosphors with a difference in a variation of the efficiency, it will be possible to mix colors of phosphors which, as regards color are (slightly) different but exhibit a different behavior as regards loss of efficiency in the case of full drive (maximum brightness), or to choose between the two phosphors.

An optimum effect is achieved when one of the two phosphors is a non-saturating phosphor. A non-saturating phosphor is herein understood to mean a phosphor in which the number of emitted photons per unit of surface and time has decreased at most 15% in the case of a drive yielding a brightness (or luminance) of 500 $Cd/m^2$ as compared with a drive yielding a brightness of 10 $Cd/m^2$. Upon excitation by means of an UV plasma which is maintained with alternating voltages, this means that, for example, at higher frequencies (at least up to 10 kHz and preferably up to 100 kHz or more) the efficiency (number of emitted photons/number of incoming photons) decreases by at most 15%. A frequently used phosphor such as $Zn_2SiO_4$:Mn (willemite) has already saturation phenomena from approximately 1 kHz in this application. The efficiency (number of emitted photons/number of incoming photons) has already dropped to approximately 90% and decreases rapidly at higher frequencies (to approximately 50% at 100 kHz).

However, for non-saturating phosphors, the efficiency remains substantially constant through a large frequency range.

Suitable non-saturating phosphors are, for example:
1) $(Ce,Gd)MgB_5O_{10}$:Tb, or CBT
2) $(Ce,La,Gd)PO_4$:Tb or LAP
3) $(Y,Gd)BO_3$:Tb.

A preferred embodiment of a display device according to the invention is characterized in that the layer of fluorescent material at the location of a pixel, viewed in a direction transverse to the first substrate, comprises at least two sub-pixels having different phosphors of substantially the same color for different sub-pixels. An incoming (video) signal can now be split up, for example, into two or more sub-signals each supplying one of the sub-pixels with a separate drive signal. By means of the sub-signals, the extent of mixing of the colors is then adjusted, or a choice is made between the sub-pixels.

These and other aspects of the invention are apparent from and will be elucidated with reference to the embodiment(s) described hereinafter.

BRIEF DESCRIPTION OF THE DRAWINGS

In the drawings:

FIG. 3 shows diagrammatically a distribution of phosphors across a pixel; while

FIGS. 5 to 8 show variations of FIG. 3.

The Figures are diagrammatic and not drawn to scale. Corresponding components generally have the same reference numerals.

DESCRIPTION OF THE PREFERRED EMBODIMENTS

Figure 1:
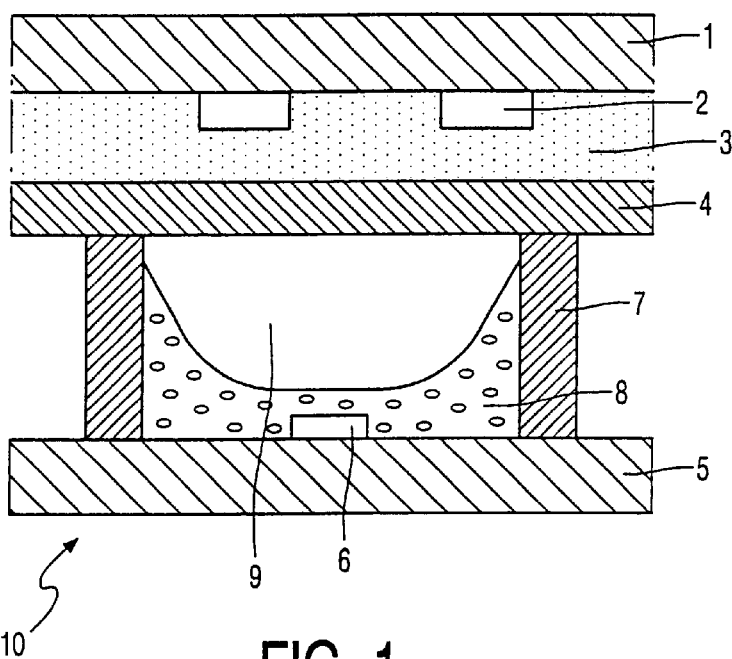
FIG. 1 is a diagrammatic cross-section of a part of a plasma display device.

FIG. 1 shows a plasma display device 10, in this case an AC display panel (AC PDP or AC Plasma Display Panel), having a first substrate 1 provided with two display electrodes 2 which are coated with a dielectric layer 3 (for example, glass), and a second, transparent substrate 5 provided with fluorescent material 8. In this embodiment, the second substrate 5 is provided with address electrodes 6. In the relevant embodiment, a sub-pixel as defined by the address electrode 6 and the display electrodes 2 is bounded by partition walls 7 which bound a discharge space. The partition walls 7 are not absolutely necessary, while display electrodes and address electrodes may be alternatively present on one substrate.

Figure 2:
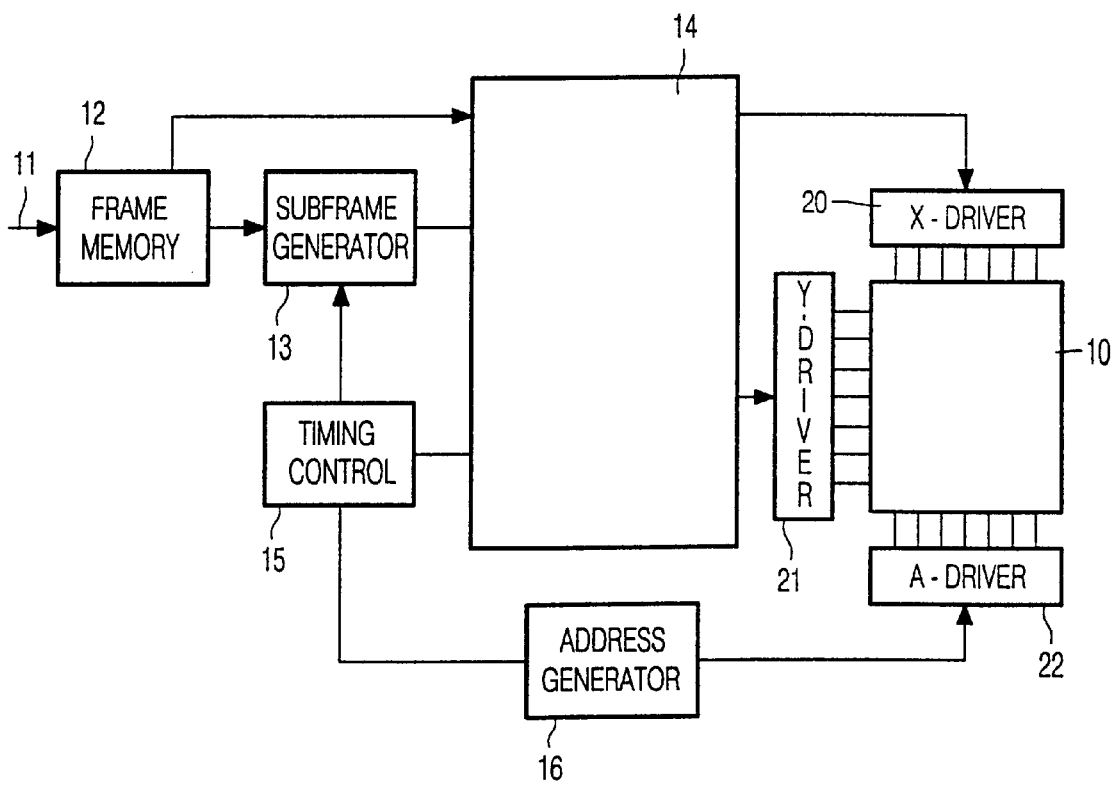
FIG. 2 shows diagrammatically a part of a plasma display device.

A gas discharge mixture 9 consisting, in this embodiment, of a helium-xenon mixture, is present in the discharge space between the substrates 1, 5. Other mixtures are alternatively possible, such as neon-xenon, argon-xenon, krypton-xenon, argon-neon-xenon, argon-helium-xenon, krypton-neon-xenon, krypton-helium-xenon or mixtures thereof, the quantity of xenon being in a range between 5 and less than 100%. As is known, UV radiation is generated in plasma display devices (plasma display panels or PDPs) in the discharge space at the area of a (sub-)pixel, which UV radiation causes the fluorescent material 8 (phosphors) to luminesce. To this end, the display electrodes 2 are driven, for example, from X and Y drivers 20, 21 and the address electrodes are driven from an A driver 22 (FIG. 2). To this end, an incoming signal 11 is stored in a frame memory 12 and in a sub-frame generator 13. The required pulses are generated in the processing unit 14 for the reset pulses, the ignition pulses and the sustain pulses which energize the display electrodes 2 via the X and Y drivers 20, 21, while addressing takes place via the A driver 22 controlled by an address generator 16. Mutual synchronization takes place via a timing control circuit 15.

After a sub-pixel has been excited, the ignition is maintained by the sustain pulses across the display electrodes within a pixel. Dependent on the grey tint to be displayed, these are offered more frequently or less frequently per pixel. The sustain frequency therefore determines, together with the grey tint, the number of times a UV photon impinges upon a phosphor.

Figure 3:
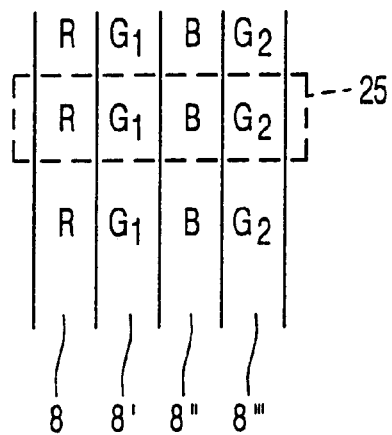

FIG. 3 is a diagrammatic front-elevational view of a display device, particularly the location of a number of phosphors 8, 8', 8'', 8''' with the colors red (R), green ($G_1$), blue (B) and a second color green ($G_2$). The broken line 25 diagrammatically represents a pixel.

Figure 4:
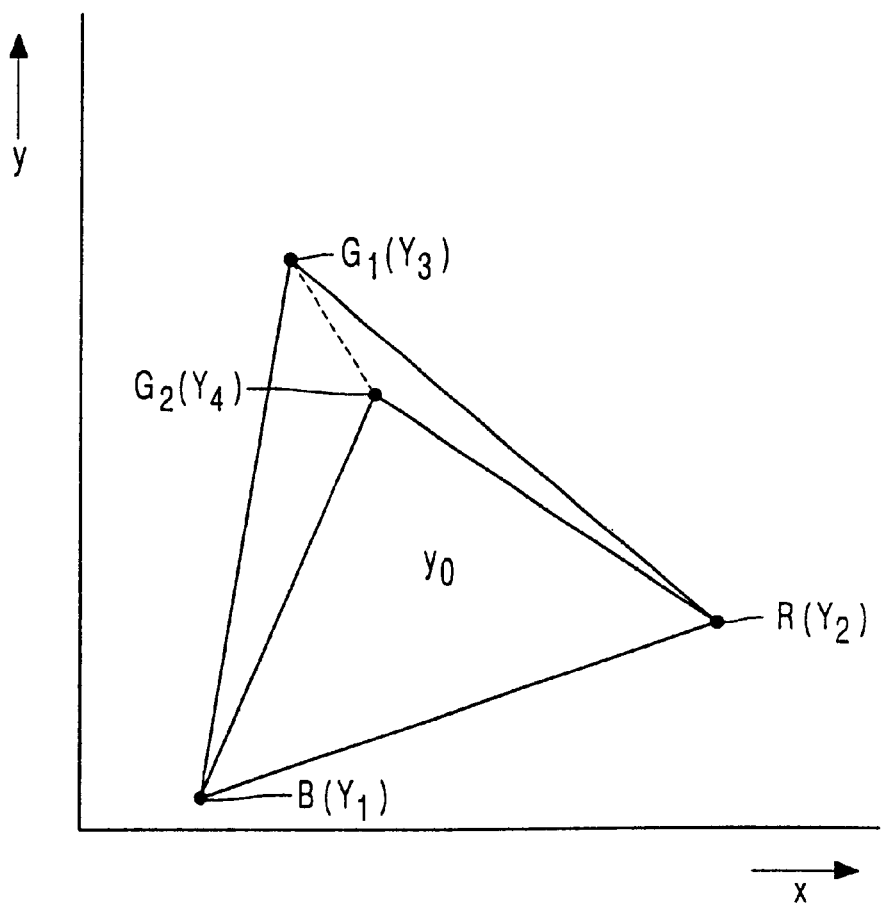
FIG. 4 shows the associated C.I.E. color triangle.

The C.I.E. color triangle of FIG. 4 shows the luminances associated with these phosphors as $B(Y_1)$, $R(Y_2)$, $G_1(Y_3)$ and $G_2(Y_4)$ (Y: luminance) in this color triangle. Generally, it holds for display of a pixel $x_o$, $y_o$ with luminance $Y_o$ by means of three phosphors $$Y_o = \sum_{i=1}^{i=3} yi$$

in which $$\sum_{i=1}^{i=3}(x_i - x_0)(Y_i/y_i) = 0 \qquad \sum_{i=1}^{i=3}(x_i - x_0)(Y_i/y_i) = 0$$

In the embodiment of FIG. 4, the point $Y_0$ can be realized by weighted excitation of the phosphors B, R and $G_1$ or by weighted excitation of the phosphors B, R and $G_2$. At an equal efficiency of all phosphors, such a weighting is not necessary (and an extra phosphor $G_2$ is in fact redundant). Since the efficiency of the green phosphor willemite (with color co-ordinates x=0.25, y=0.67) denoted by $G_1$ in FIG. 4, rapidly deteriorates at higher frequencies, the presence of a second phosphor $G_2$ provides the possibility of such a choice, notably when a non-saturating phosphor is chosen for $G_2$, for example, said CBT (with color co-ordinates x=0.36, y=0.54). The co-ordinates ($x_o$, $y_o$) are now found by means of the equations $$\sum_{i=1}^{i=4}(x_i - x_0)(Y_i/y_i) = 0 \qquad \sum_{i=1}^{i=4}(y_i - y_0)(Y_i/y_i) = 0$$

in which now $$\sum_{i=1}^{i=4} Y_i = Y_0$$

in which simultaneously the efficiency $$\eta_0 = \frac{Y_0}{\sum_{i=1}^{i=4} \frac{Y_i}{\eta_i}}$$

may be maximal. The choice between the combinations $Y_1$, $Y_2$, $Y_3$ and $Y_1$, $Y_2$, $Y_4$ is now made by determining the maximal efficiency $\eta_o$ by means of $Y_4=0$, or $\eta_o(Y_1, Y_2, Y_3)$, and by $Y_3=0$, or $\eta_o(Y_1, Y_2, Y_4)$. The group of phosphors yielding the highest efficiency is then driven.

Similar calculations can be performed for points in the triangles, $Y_2$, $Y_3$, $Y_4$ and $Y_1$, $Y_3$, $Y_4$.

The choice between $Y_3$ ($G_1$) and $Y_4$ ($G_2$) is made in the device of FIG. 2 by processing information about the color to be displayed, stored in the frame memory 12, in the processing unit 14. To this end, this unit comprises, for example, a microprocessor or a look-up table in which the behavior (notably the efficiency of the phosphors as a function of the frequency (grey scale to be displayed) is stored. Dependent on the above consideration, that phosphor is driven with which the desired color is obtained at the highest efficiency. To this end, the X and Y drivers are supplied with drive signals for the relevant sub-pixels.

Figures 5, 6, 7, 8:
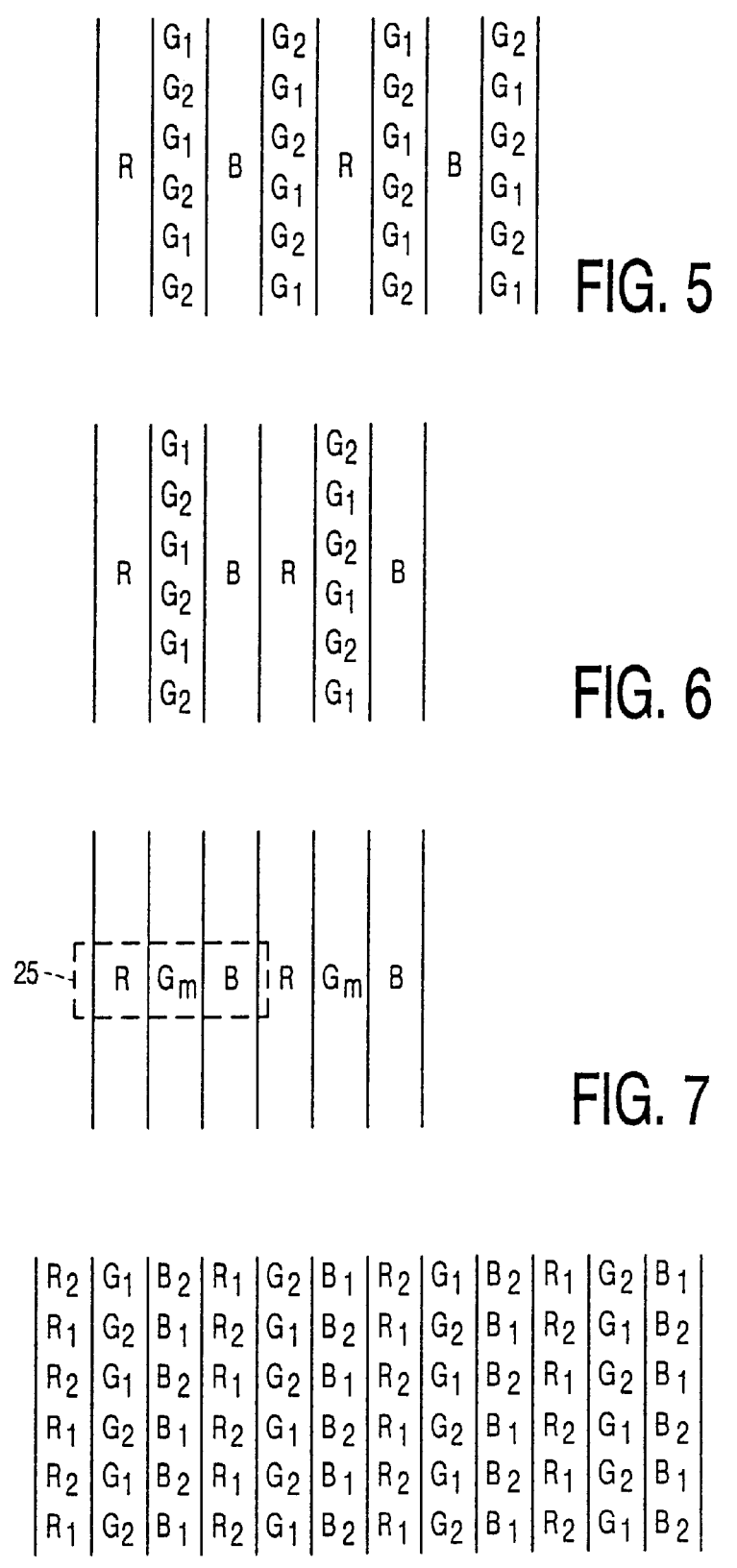

FIGS. 5 to 7 show a number of variants in which the phosphors are distributed across sub-pixels in different ways.

In FIG. 7, a pixel 25 comprises three sub-pixels, the green sub-pixel comprising a phosphor layer $G_m$ which consists of a mixture of willemite and CBT.

Although the above-described discrimination between two different phosphors cannot be made with drive signals, it appears that the mixture is less rapidly saturated so that a higher efficiency is achieved through a large part of the color triangle.

In FIG. 8, extra blue and red phosphors ($B_2$, $R_2$) are added, which are preferably non-saturating so that a good color adjustment goes together with a maximum efficiency.

A completely different possibility is the use of a so-called white phosphor instead of $G_2$ in FIGS. 3, 5, 6.

The invention is of course not limited to the embodiments described hereinbefore. For example, the sub-pixels may have, for example, different surface areas, which may be incorporated in the data in the processing unit 14. The invention is also applicable to field emission display devices in which the efficiency of given phosphors is also dependent on the luminance to be adjusted.

In summary, the invention relates to a luminescence-based color display device having at least one extra phosphor per pixel, in which, dependent on the color to be displayed and the luminance (brightness), the combination of sub-pixels to be driven is determined.

The invention relates to each and every novel characteristic feature and each and every combination of characteristic features.

We claim:

1. A color display device comprising a first substrate provided with a layer of fluorescent material, and a second, transparent substrate, said color display device comprising means for addressing pixels during use, characterized in that the layer of fluorescent material comprises at least two different phosphors of substantially the same color at the location of a pixel.

2. A color display device as claimed in claim 1, characterized in that one of the two phosphors is a non-saturating phosphor.

3. A color display device as claimed in claim 1, characterized in that the layer of fluorescent material at the location of a pixel, viewed in a direction transverse to the first substrate, comprises at least two sub-pixels having different phosphors of substantially the same color for different sub-pixels.

4. A color display device as claimed in claim 3, characterized in that the display device comprises drive means for converting an incoming signal into at least two drive signals for separate sub-pixels.

5. A color display device as claimed in claim 4, characterized in that, dependent on the color to be displayed and the luminance of the pixel, the drive means determine the drive of the sub-pixels.

6. A color display device as claimed in claim 1, or characterized in that the layer of fluorescent material comprises at least two different green phosphors.

7. A color display device as claimed in claim 1, characterized in that the layer of fluorescent material comprises a white phosphor.

8. A color display device as claimed in claim 1, characterized in that the first substrate is provided with address electrodes, and the second, transparent substrate is provided with at least two display electrodes having a gas discharge mixture between the two substrates.

* * * * *